W. F. WHITE.
Improvement in Fertilizer-Distributer.

No. 126,118.  Patented April 23, 1872.

Witnesses.  
S. N. Piper.  
L. N. Möller.

Wilbur F. White.  
by his attorney  
R. H. Eddy

UNITED STATES PATENT OFFICE.

WILBUR F. WHITE, OF BELCHERTOWN, MASSACHUSETTS.

IMPROVEMENT IN FERTILIZER-DISTRIBUTERS.

Specification forming part of Letters Patent No. 126,118, dated April 23, 1872.

*To all persons to whom these presents may come:*

Be it known that I, WILBUR F. WHITE, of Belchertown, of the county of Hampshire, of the State of Massachusetts, have invented a new and useful or Improved Manure-Spreading Cart; and do hereby declare the same to be fully described in the following specification and represented in the accompanying drawing, of which—

Figure 1:
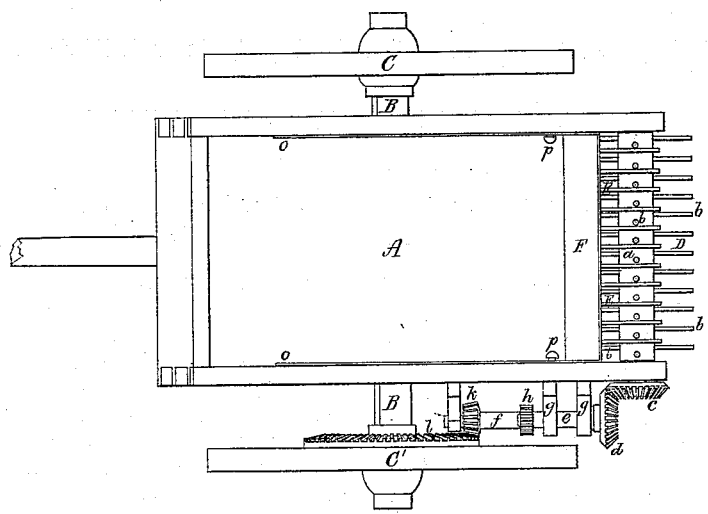
Figure 2:
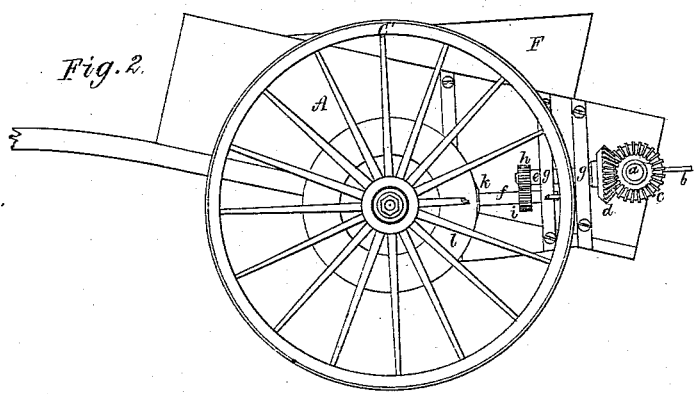
Figure 3:
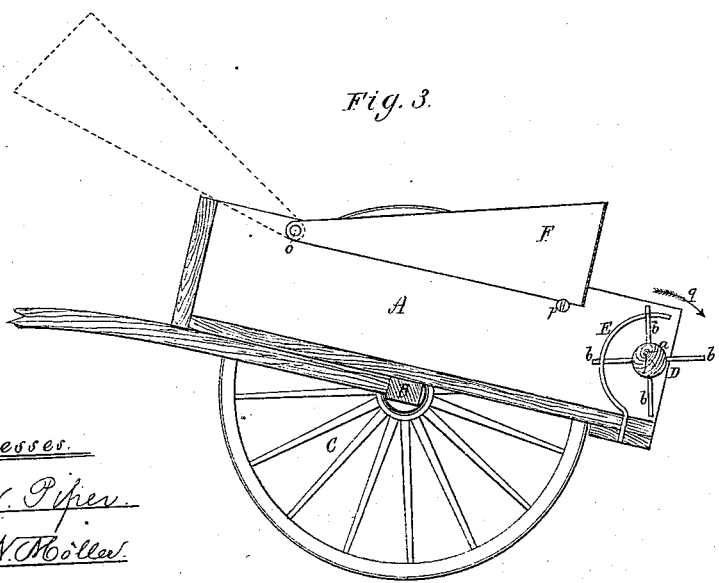

Figure 1 is a top view; Fig. 2, a side elevation; and Fig. 3, a longitudinal section of it.

In such drawing, A denotes a cart-body; B, the axle; and C C', the wheels thereof. The said body is open at its rear end, across which there is extended the rotary spreader D, which consists of a drum or shaft, $a$, provided with four series of straight rods or teeth, $b\ b$, projecting from it in manner as shown. The spreader-shaft has its bearings in the sides of the body, there being fixed on one end of such shaft a bevel-gear, $c$, which engages with another such gear, $d$. The latter is fixed upon one of two shafts, $e\ f$, arranged at one side of the cart-body, and in cleats or boxes $g\ g$ attached thereto. These shafts are connected by two spur-gears, $h\ i$, the shaft $f$ having a bevel-gear, $k$, fixed on it to engage with a larger bevel-gear, $l$, carried by one of the wheels C C'. At the rear part of the cart-body is a curved grid or grate, E, composed of teeth or wires, curved and arranged as shown, the same being so that the teeth of the spreader may work between those of the grid. Furthermore, there is applied to the cart-body a movable guard, F, formed and arranged in manner as represented. It is pivoted to the body at $o\ o$, and rests on one or more studs, $p$. This guard may be turned from the position shown in full black lines into that exhibited in dotted lines in Fig. 3, it generally being placed in the latter position while the cart-body is being supplied with manure. The purpose of the guard is to prevent waste of the manure while the cart is tipped back, and in use to spread manure on a field.

The direction of revolution of the spreader D is indicated by the arrow $g$, the manure being taken up by the teeth of the spreader and raised and discharged over the teeth of the grid. Were the direction of motion of the spreader reversed during a forward movement of the cart, the manure would be drawn through the space beneath the grid and discharged under the spreader and next the floor of the cart-body. This method of discharging the manure would render the grid liable to be clogged, especially by stones, sticks, straw, or foreign matters in the manure; but by making the spreader to revolve in a manner to cause its teeth to rise through the grate or grid, there will be no danger of the latter becoming clogged as described.

The mechanism, as explained, for revolving the toothed spreader by one of the wheels while the cart may be in the act of being advanced or drawn forward, and is tipped back so as to cause the manure, when in its body, to incline toward and descend upon the grid, is of a character to make the spreader revolve in a direction by which its teeth while discharging manure will ascend between the teeth of the grid, the guard preventing the too free escape of the manure or waste of it.

I make no claim to the machine or vehicle for sowing a fertilizer as described in the United States patent 25,064, my arrangement of parts being very different, and causing them to operate differently and with advantage over anything or arrangement shown in such patent.

The teeth of my rotary spreader extend through the spaces between the bars of the grid, and both spreader and grid are arranged at the open rear end of the cart-body, and the movable guard is disposed so as to prevent waste of the material thrown up by the spreader, or, in other words, to intercept such of the manure as may be thrown back by the spreader. Besides, my spreader operates to seize the manure and raise it upward on and over the grate, which is open at top.

What I claim as my invention is as follows:

In a cart for spreading manure, the combination and arrangement of the rotary spreader D, revolving so as to raise the manure, as described, with the grid E and guard F, all constructed and operating in the manner and for the purpose specified.

WILBUR F. WHITE.

Witnesses:
R. H. EDDY,
J. R. SNOW.